(12) United States Patent
Berg et al.

(10) Patent No.: US 8,578,379 B2
(45) Date of Patent: Nov. 5, 2013

(54) MANAGING MEMORY OVERLOAD OF JAVA VIRTUAL MACHINES IN WEB APPLICATION SERVER SYSTEMS

(75) Inventors: Douglas C. Berg, Rochester, MN (US); Hai Shan Wu, Beijing (CN); Brian K. Smith, Raleigh, NC (US); Michael J. Spreitzer, Croton-On-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 13/281,757

(22) Filed: Oct. 26, 2011

(65) Prior Publication Data

US 2012/0137290 A1    May 31, 2012

(30) Foreign Application Priority Data

Nov. 30, 2010 (CN) .......................... 2010 1 0577046

(51) Int. Cl.
*G06F 9/455* (2006.01)
(52) U.S. Cl.
USPC ............................................. 718/1; 707/813
(58) Field of Classification Search
None
See application file for complete search history.

(56) References Cited

U.S. PATENT DOCUMENTS

| 6,075,938 | A | * | 6/2000 | Bugnion et al. | ................ | 703/27 |
| 2006/0070051 | A1 | * | 3/2006 | Kuck et al. | .................... | 717/162 |
| 2007/0282915 | A1 | * | 12/2007 | Vosshall et al. | ............... | 707/200 |
| 2009/0113161 | A1 | | 4/2009 | Bitner et al. | | |

OTHER PUBLICATIONS

Little's Law,—Wikipedia, http://en.widipedia.org/wike/Little%27s-law, Oct. 24, 2011, pp. 1-3.

* cited by examiner

*Primary Examiner* — Emerson Puente
*Assistant Examiner* — Sisley Kim
(74) *Attorney, Agent, or Firm* — Gibb & Riley, LLC (57) ABSTRACT

The invention relates to memory overload management for Java virtual machines (JVMs) in Web application sever systems. Disclosed is a method and system of memory overload management for a Web application sever system, wherein the Web application sever system comprises multiple JVMs, the method comprising: determining one or more replica shards for which replacement shall be performed; determining one or more target JVMs for storing a corresponding replica shard set including at least one replica shard from the one or more replica shards; and for each target JVM, performing the following: judging whether the free memory of the target JVM is adequate for storing the corresponding replica shard set; if the judging result is negative, performing the following: causing the target JVM to suspend the creation of session until the free memory of the target JVM becomes adequate for storing the corresponding replica shard set.

13 Claims, 6 Drawing Sheets

| sampling point k | measured value | | | calculated value | | |
|---|---|---|---|---|---|---|
| | admiRate(k-1) | heapUtil(k-1) | heapUtil(k) | b | a | heapUtilEstim(k) |
| 0 | 0.00000 | 0.00000 | 0.27222 | | | 0.00000 |
| 1 | 49.86000 | 0.27222 | 0.54254 | | | 0.00000 |
| 2 | 49.66000 | 0.54254 | 0.76194 | | | 0.00000 |
| 3 | 41.64000 | 0.76194 | 0.83915 | | | 0.00000 |
| 4 | 32.92000 | 0.83915 | 0.84125 | | | 0.00000 |
| 5 | 29.60000 | 0.84125 | 0.83555 | | | 0.00000 |
| 6 | 27.80000 | 0.83555 | 0.82668 | | | 0.00000 |
| 7 | 25.86000 | 0.82668 | 0.81152 | | | 0.00000 |
| 8 | 24.86000 | 0.81152 | 0.77387 | | | 0.00000 |
| 9 | 24.60000 | 0.77387 | 0.72882 | | | 0.00000 |
| 10 | 25.10000 | 0.72882 | 0.66329 | 0.00700 | 0.73383 | 0.17563 |
| 11 | 27.50000 | 0.66329 | 0.61616 | 0.00713 | 0.72186 | 0.68278 |
| 12 | 31.26000 | 0.61616 | 0.61207 | 0.00442 | 0.81612 | 0.58287 |
| 13 | 35.70000 | 0.61207 | 0.67044 | 0.00359 | 0.84358 | 0.62787 |
| 14 | 38.44000 | 0.67044 | 0.71155 | 0.00377 | 0.83553 | 0.71049 |
| 15 | 35.66000 | 0.71155 | 0.73764 | 0.00404 | 0.82276 | 0.73842 |
| | ...... | ...... | | | | |
| 41 | 33.64000 | 0.74094 | 0.73727 | 0.00594 | 0.72093 | 0.69708 |
| 42 | 33.28000 | 0.73727 | 0.73379 | 0.00532 | 0.75048 | 0.70854 |
| 43 | 33.38000 | 0.73379 | 0.72794 | 0.00572 | 0.73201 | 0.74172 |
| 44 | 33.88000 | 0.72794 | 0.72767 | 0.00647 | 0.69798 | 0.75210 |

MANAGING MEMORY OVERLOAD OF JAVA VIRTUAL MACHINES IN WEB APPLICATION SERVER SYSTEMS

BACKGROUND

The invention relates to performance management of Java virtual machines and, in particular, to memory overload management of Java virtual machines in Web application sever systems.

In a Web application sever system consisted of Java virtual machines (JVMs), JVMs are used as servers that have the function of the server machine. The server function of a JVM is implemented with instances of the web application server that are deployed on the JVM. Features of the so-called grid that consists of multiple JVMs include scalability and fault tolerance.

JVM's server functions include processing of sessions initiated by the client. The client-initiated sessions are routed, through a proxy, to one or more JVMs in the web application server system. The Web application server instance handles the sessions by executing the Java servlet deployed on the JVM. Specifically, the JVM receives a request from the client, handles the request and returns a response to the client. Examples of the client's request are HTTP(Hypertext Transport Protocol) request, SIP(Session Initiation Protocol) request, etc.

Session data are stored in a web application server system. Generally, session data are divided into different data blocks (also referred to as "shard"). A shard that is active is called "primary shard", and the replica of a primary shard is called "replica shard". For availability purpose, the primary shard and its corresponding replica shard must not be stored in the same JVM or the JVMs that share the same physical machine.

When a JVM of the web application server system stops operation due to a failure, for example, the primary shard and the replica shard stored on the JVM will become unusable. In order to maintain the continuity of the client session in connection with the primary shard on the failed JVM, the primary shard corresponded replica shard stored on other JVM will become primary shard. At this time, shard replacement shall be carried out. In other words, on the one hand, the replication (aka, replica shard) of the newly generated primary shard shall be stored to a JVM that is different from the JVM on which the primary shard resides. On the other hand, the replica shard formerly stored on the failed JVM shall be moved to other JVM. And shard replacement may also be carried out when there is a new JVM being added to the web application server system. To conduct shard replacement, it is needed to use memory space on another JVM. If the use of the memory exceeds the maximal space that the JVM may provide, memory overload will occur in the JVM which seriously influence the performance of the JVM.

BRIEF SUMMARY

In order to avoid memory overload caused by shard replacement, the invention proposes an improved solution to memory overload management for JVM in web application systems, thereby conduct shard replacement based on usage of memory at the JVM.

In one aspect, it is provide a method of memory overload management for a Web application sever system, wherein the Web application sever system comprises multiple JVMs for processing sessions, the method comprising: determining one or more replica shards for which replacement shall be performed; determining one or more target JVMs for storing a corresponding replica shard set including at least one replica shard from the one or more replica shards; and for each target JVM, performing the following: judging whether the free memory of the target JVM is adequate for storing the corresponding replica shard set; if the judging result is negative, performing the following: causing the target JVM to suspend the creation of session until the free memory of the target JVM becomes adequate for storing the corresponding replica shard set; storing the corresponding replica shard set to the target JVM; and causing the target JVM to resume the creation of session.

In another aspect, it is provided A system of memory overload management for a Web application sever system, the Web application sever system comprising multiple Java machines for processing sessions, the system comprising: a replica shard determining device, configured to determine one or more replica shards for which replacement shall be conducted; a target JVM determining device, configured to determine one or more target JVMs for storing a corresponding replica shard set including at least one replica shard from the one or more replica shards determined by the replica shard determining device; a judging device, configured to judge whether the free memory of a target JVM is adequate for storing the corresponding replica shard set; a session control device, configured to control the creation of session on a target JVM depending on whether the free memory of the target JVM is adequate for storing the corresponding replica shard set; and a shard replacement device, configured to store a replica shard onto a target JVM when the free memory of the target JVM is adequate for storing a corresponding replica shard set.

BRIEF DESCRIPTION OF THE SEVERAL VIEWS OF THE DRAWINGS

The inventive features considered to be characterized of the invention are described in the Summary of Invention and the claims appended to the specification. However, the invention itself, its usages, other objectives, features and advantages may be better understood through reading the following detailed description of illustrative embodiments with reference to drawings, in which:

DETAILED DESCRIPTION

Hereinafter, embodiments of the present invention will be described with reference to the accompanying drawings. In the following description, many specific details are illustrated so as to understand the present invention more comprehensively. However, it is apparent to the skilled in the art that implementation of the present invention may be practiced without these details. Additionally, it should be understood that the present invention is not limited to the particular embodiments as introduced here. On the contrary, any arbitrary combination of the following features and elements may be considered to implement and practice the present invention, regardless of whether they involve different embodiments. Thus, the following aspects, features, embodiments and advantages are only for illustrative purposes, and should not be construed as elements or limitations of the appended claims, unless otherwise explicitly specified in the claims.

Figure 1A:
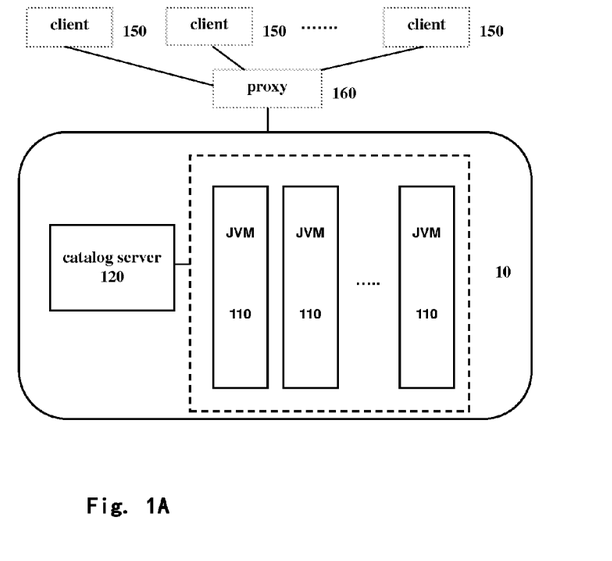
FIGS. 1A and 1B are two illustrative diagrams showing a Web application server system 10 in which various embodiments of the invention may be implemented.
Figure 1B:
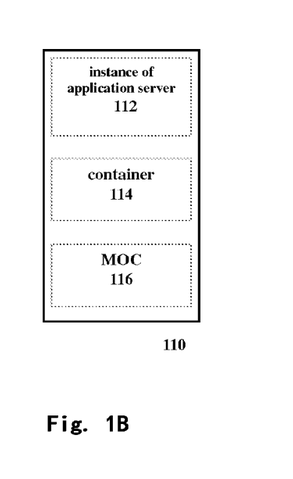

FIGS. 1A and 1B are two illustrative diagrams showing a Web application server system 10 in which various embodiments of the invention may be implemented.

As shown in FIG. 1A, the Web application server system 10 comprises a catalog server 120 and multiple Java virtual machines (JVMs) 110.

As shown in FIG. 1B, on each JVM, there are deployed an instance of Web application server 112, a container 114 and a memory overload controller (MOC) 116.

The instance of Web application server 112 is configured to process sessions by executing Java servlets deployed on the JVM.

The container 114 is configured to provide application service functions such as security and transaction support. The container 114 may be used to store shards as well as Java servlets.

The memory overload controller 116 is configured to manage memory of the corresponding JVM. In the context of the technical field, the memory of JVM is also referred to as "heap". JVMs 110 use a garbage collection (GC) mechanism to collect memory space. The free memory includes available memory and the memory that has been released and become garbage; after GC, the garbage memory is collected and becomes available memory.

The function of memory overload controller 116 includes controlling the JVM's session admission rate, monitoring the end of GC, and gather statistical data about the use of memory. For example, the memory overload controller may collect the JVM's heap utilization, session admission rate and number of outstanding or pending sessions after the end of a global GC (i.e., performing garbage collection with respect to all memory space of the JVM).

As illustratively shown in FIG. 1A, a session initiated by a user at client 150, for example a HTTP (Hypertext Transmission Protocol)/SIP(Session Initiation Protocol) session, is routed to one or more JVMs 110 of the Web application server system 10 via a proxy 160, which will be processed by a corresponding instance of Web application server 112. For example, after the user completes input into a form on a page of the browser page (not shown) at the client 150, a HTTP request is sent to the JVM 110 that implements a HTTP server. The JVM 110 invokes corresponding HTTP servlets to search the database (not shown) for corresponding data, establishes a HTTP response message to the HTTP request and transmits the HTTP response message back to the client 150 for browsing and use by the user of the client. During the process, various session data that are generated in association with the session initiated by the client 150 are also stored in the memory of the JVM in the Web application server system 10 until the end of the session. After the session is ended, the corresponding session data will become garbage and the memory space occupied by them will be recollected by the GC mechanism.

One of the functions of the catalog server 120 shown in FIG. 1A is, by collaborating with individual JVM 110, for example, with JVM's memory overload controller 116, allocating the shard of session to appropriate JVM 110 for storage and recording information on the storage location of the shard and the replica shard. The shard allocation algorithm used by the catalog server 120 can guarantee the shard and the replica shard are not stored in a same container 114 so as to ensure error tolerance and high availability.

Figure 2:
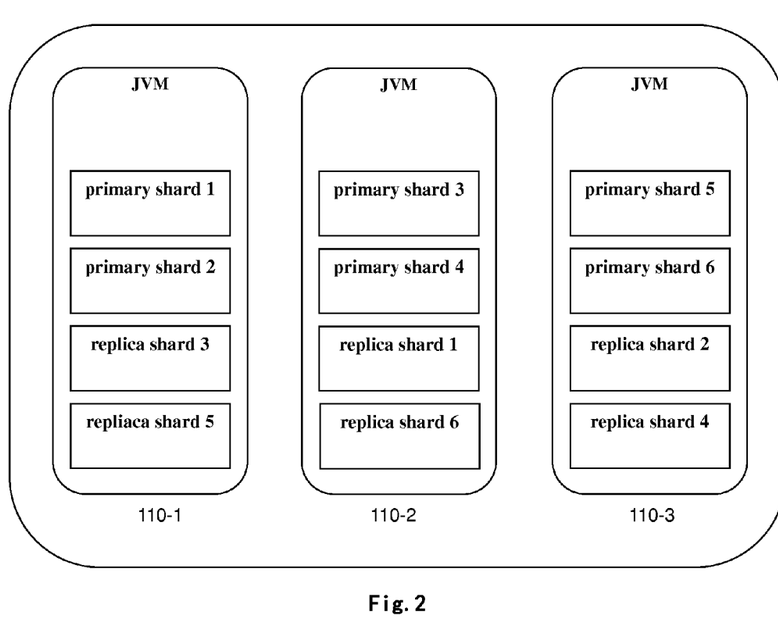
FIG. 2 is an illustrative diagram showing the distribution of shards on different JVMs.

FIG. 2 is an illustrative diagram showing the distribution of shards on different JVMs. FIG. 2 shows three JVM 110-1, 110-2 and 110-3. It also shows six primary shards and six replica shards, namely primary shard 1 and replica shard 1, primary shard 2 and replica shard 2, . . . , and primary shard 6 and replica shard 6. As shown in the figure, at a certain time, primary shard 1 and primary shard 2 are stored on JVM 110-1, whereas replica shard 1 is stored on JVM 110-2 and replica shard 2 is stored on JVM 110-3; similarly, primary shard 3 and primary shard 4 are stored on JVM 110-2, whereas replica shard 3 is stored on JVM 110-1 and replica shard 4 is stored on JVM 110-3; primary shard 5 and primary shard 6 are stored on JVM 110-3, whereas replica shard 5 is stored on JVM 110-1 and replica shard 6 is stored on JVM 110-2.

Each shard and its corresponding replica shard are distributed in separate JVMs. Those skilled in the art shall understand that this kind of memory allocation may be made by the catalog server 120.

Figure 3:
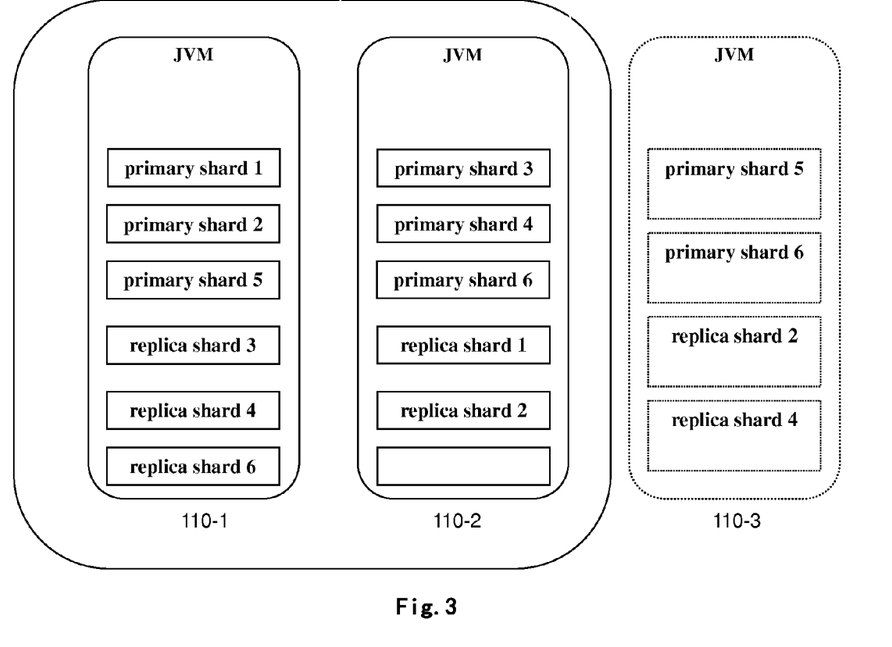
FIG. 3 is an illustrative diagram showing shard replacement for the distributed shards in FIG. 2.

FIG. 3 is an illustrative diagram showing shard replacement for the distributed shards in FIG. 2. Specifically, at a certain time, a failure occurs in JVM 110-3, for example, as represented by dotted line in FIG. 3. At this time, primary shard 5, primary shard 6, replica shard 2 and replica shard 4 on JVM 110-3 will become unusable.

The system 10, upon detecting the failure in JVM 110-3, shall re-allocate JVM memory for related shards.

Firstly, the replica shard, which serves as the backup for the primary shard, is activated.

The primary shard 5 on JVM 110-3 has become unusable, so the replica shard 5 on JVM 110-1 shall become primary shard.

Similarly, the primary shard 6 on JVM 110-3 has become unusable, so the replica shard 6 on JVM 110-2 shall become primary shard.

Then, replica replacement is performed.

The replica shard 5 formerly stored on JVM 110-1 (FIG. 2) has become a primary shard 5 (FIG. 3). Accordingly, it is needed to create a replica shard for the primary shard 5 (FIG. 3). The catalog server 120 will designate a JVM other than JVM 110-1 for storing the replica shard 5. In the present example, only JVM 110-1 and JVM 110-2 are available, so the catalog server 120 will designate JVM 110-2 for storing the replica shard 5.

In a similar fashion, the catalog server 120 will designate a JVM other than JVM 110-2 for storing a newly created replica shard 6. In the present example, only JVM 110-1 and JVM 110-2 are available, so JVM 110-1 will be designated for storing the replica shard 6.

The catalog server 120 also designates a JVM for transferring the replica shard 2 which is formerly stored on JVM 110-3 (FIG. 2). In the present example, the primary shard 2 is stored on JVM 110-1, so JVM 110-2 is designated to store the replica shard 2 (FIG. 3).

Similarly, the catalog server also designates a JVM for transferring the replica shard 4 which is formerly stored on JVM 110-3 (FIG. 2). Because the primary shard 4 is stored on JVM 110-2, JVM 110-1 is designated to store the replica shard 4 (FIG. 3).

As a result, as shown in FIG. 3, stored on JVM 110-1 are primary shard 1, primary shard 2 and replica shard 3, as well as primary shard 5, replica shard 6 and replica shard 4, wherein the replica shard 6 and the replica shard 4 are newly added and need to occupy additional memory.

Similarly, on JVM 110-2, there are stored primary shard 3, primary shard 4 and replica shard 1, as well as primary shard 6, replica shard 5 and replica shard 2, wherein the replica shard 5 and the replica shard 2 are newly added and need to consume additional memory.

The above process is equivalent to transferring replica shard 6, replica shard 4, replica shard 5 and replica shard 2 respectively from one location to another location. Therefore, the process is also called "replica replacement". Because the involved shards are shards of session data, the process is also called "session replacement".

FIG. 3 shows the distribution of session's primary shards and replica shards on JVM 110-1 and 110-2 after replica replacement or session replacement is performed, with the assumption that there is adequate free memory on JVM 110-1 and 110-2.

Figure 4:
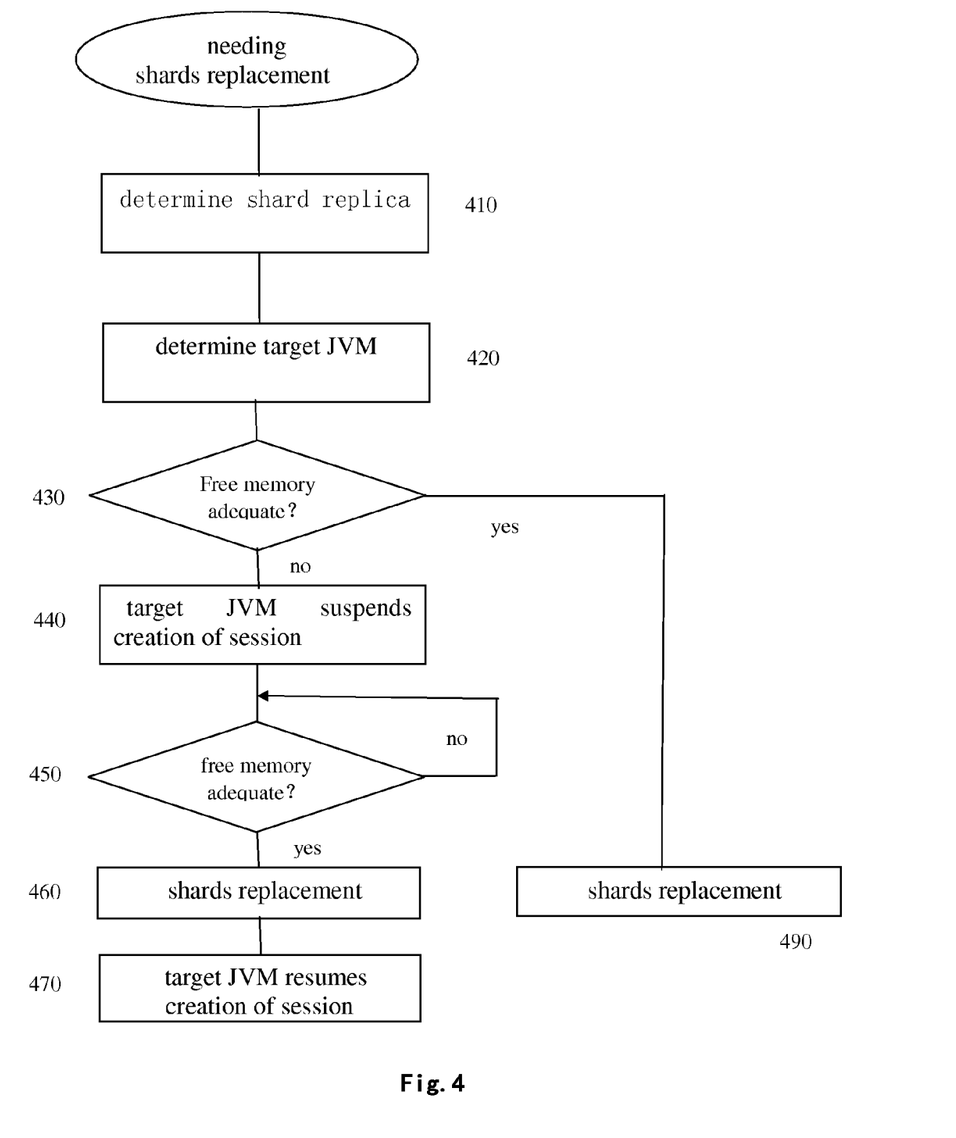
FIG. 4 is an illustrative flow chart of the method in accordance with one embodiment of the invention.

If the free memory on JVM 110-1 and/or JVM 110-2 cannot satisfy the amount of memory needed for performing replica replacement when JVM 110-3 is at fault, designation of JVM 110-1 and/or VM 110-2 by the catalog server will lead to the lowering of performance of corresponding JVM and even to such errors as machine crashing and re-starting. FIG. 4 is an illustrative flow chart outlining a method in accordance with one embodiment of the invention. Refer to FIG. 4, the process of the method starts with the detection of an event that leads to the need for conducting replica replacement. Various ways of monitoring exist in the art, including so called "heart-beating report" mechanism. For example, JVM 110-1, 110-2 and 110-3 may send status report to the catalog server 120 regularly. If the catalog server 120 does not receive the report from a JVM within a pre-defined time, it is determined that the JVM is at fault. At this time, the replica shard corresponding to the primary shared on the JVM, which is stored on another JVM, shall become a primary shard. At this time, it is needed to conduct shard replacement. On the one hand, for the primary shard changed from the replica shard, a replica shard is stored onto a JVM other than the JVM of the primary shard. On the other hand, any replica shard that is formerly stored on the failed JVM shall be transferred onto other JVM.

First, at Step 410, one or more replica shards are determined for which replacement shall be performed.

For example, as shown in FIG. 3, when JVM 110-3 is at fault, it is determined that replacement is necessary for replica shard 5, replica shard 6, replica shard 2 and replica shard 4. Those replica shards are all have definite size.

Then, at Step 420, one or more target JVMs for storing a corresponding replica shard set including at least one replica shard from the one or more replica shards for which replacement shall be performed, are determined.

Step 420 may be implemented in any manner known in the art. For example, as shown in FIG. 3, in line with the principle of "storing a primary shard and its replica shard on separate JVMs", it may be determined that replica shard 5 and replica shard 2 shall be stored onto JVM 110-2, and replica shard 6 and replica shard 4 shall be stored onto JVM 110-1.

According to one embodiment of the invention, under the prerequisite of abiding by the principle of "storing a primary shard and its replica shard on separate JVMs", the JVM with short average session life time may be selected as target JVM. Based on actual needs, a plurality of JVMs with short average session life time may serve as target JVM; therefore, one or more target JVMs may selected.

The term "session life time", also called "session life cycle", refers to the period of time from the creation to the end of a session on a JVM. The term "average session life time" refers to the average value of session life time of a plurality of sessions on a JVM. Those skilled in the art would appreciate that the MOC 116 on a JVM 110 may record the statistical data about the session life time of the sessions on the JVM. It would not be difficult to obtain or derive the average session life time on the JVM based on the data.

The heap usage on a JVM, or the amount of memory that is consumed, depends on the number of active sessions on the JVM. When the life cycle of a session is ended, the memory occupied by data associated with the session will be released. Therefore, the shorter the life time of the session, the earlier the memory occupied by its associated data is released. Therefore, the shorter the average session life time on a JVM is, the greater the probability is that there is adequate free memory on the JVM.

An example of how to calculate the average session life time is provided below.

As previously stated, the memory overload controller may collect the session admission rate (admiRate$_k$) and the number of pending sessions(outs tan dingSess$_k$) on the current JVM. The expression admiRate$_k$ denotes the rate at which the JVM admits sessions during a period of time from the end of the $k^{th}$ global GC to the current time, or the number of sessions admitted in unit time. The expression outs tan dingSess$_k$ denotes the number of sessions that are still not ended on the JVM at present time after the end of the $k^{th}$ global GC.

The estimated value of the session's life time is related to the session admission rate and the number of outstanding sessions. Assuming that the session admission rate is constant, the larger the number of the outstanding sessions, the longer the life time of the sessions. Assuming the number of outstanding sessions is constant, the bigger the session admission rate, the shorter the life time of the sessions.

According to Little's Law in the theory of queuing, the average number of customers in a stable system is equal to the average customer arrival rate multiplied by the average time a customer stays in the system (refer to Wikipedia at http://en.wikipedia.org/wiki/Little's_law). The term "average" here refers to a result obtained through long-term observation. Corresponding to the average customer arrival rate in the Little's Law, embodiments of the invention use the average session admission rate(avgAdmiRate$_k$) to represent the session admission rate obtained in a very long cycle of observation. The session admission rate admiRate$_k$ is the average rate that can be measured in a relative short cycle (the kth cycle). According to experiences, the inventors find that the session admission rate of the (k−1) th cycle admiRate$_{k-1}$ and the session admission rate of the kth cycle admiRate$_k$ have remarkable influence on the average session admission rate of the kth cycle avgAdmiRate$_k$, the session admission rate of other cycles have little influence on it. Therefore, by assigning a weight of 0.5 to admiRate$_{k-1}$ and admiRate$_k$ respectively, the average session admission rate of the kth cycle avgAdmiRate$_k$ may be obtained as the following:

$$\text{avgAdmiRate}_k = 0.5 * \text{admiRate}_k + 0.5 * \text{admiRate}_{k-1} \quad (1)$$

The average time a customer stays in the system in the Little's Law corresponds to avgSessLifeTime$_k$ in this disclosure; the average number of customers corresponds to outs tan dingSess$_k$ in this disclosure. Accordingly, based on outs tan dingSess$_k$ and avgAdmiRate$_k$, the average session life time (avgSessLifeTime$_k$) on a JVM may be estimated with the following formula (2) or (2'):

$$\text{avgSessLifeTime}_k = \text{outs tan dingSess}_k / \text{avgAdmiRate}_k \quad (2)$$

or $$\text{avgSessLifeTime}_k = \text{outs tan dingSess}_k / (0.5 * \text{admiRate}_k + 0.5 * \text{admiRate}_{k-1}) \quad (2')$$

Hereinafter other steps following Step 420 of the method process will be described. The following steps describe the processing for individual target JVMs.

At Step 430, it is determined whether the free memory on the target JVM is adequate for storing the corresponding replica shard set.

For example, the free memory on JVM 110-2 is estimated to judge whether the free memory on JVM 110-2 is adequate for storing the replica shard 5 and the replica shard 2. Because both the size of the replica shard 5 and the size of the replica shard 2 are known, whether the free memory on JVM 110-2 is adequate for storing the replica shard 5 and the replica shard 2 may be determined simply by making comparison between the amount of the free memory and the addition of the two sizes.

The amount of free memory on a JVM 110 may be obtained from the memory overload controller 116 of the JVM 110. Those skilled in the art shall appreciate that the memory overload controller 116 is able to provide the amount of free memory each time when a global GC is ended. As to the amount of free memory at other time, it may be estimated based on statistical data gathered by the memory overload controller 116.

According to one embodiment of the invention, the amount of free memory on a JVM may be estimated in the following manner. After the kth global GC is ended, the memory overload controller may gather the heap utilization (heapUtil$_k$) at the time, which is a percent ratio of the heap usage to total amount of memory (total heap), as well as the session admission rate (admiRate$_k$) on the JVM. With the two sets of data, we may obtain an estimated value of the heap utilization in the period between the kth and the (k+1)th global GC (heapUtilEstim$_k$) with the following formula (3):

$$\text{heapUtilEstim}_k = a * \text{heapUtil}_k + b * \text{admiRate}_k \quad (3)$$

In the formula (3), a and b are experience parameters that may be learned from the session admission rate and heap utilization obtained in past sampling cycles. The method that may be used for learning is Least Square Method or Kalman Filter that can be used for conducting linear fit. Because the total amount of memory (totalHeap) is known, the amount of free memory (freeHeapEstim$_k$) at the time may be estimated with the following formula (4) or (4'):

$$\text{freeHeapEstim}_k = \text{totalHeap} - \text{heapUtilEstim}_k * \text{totalHeap} \quad (4)$$

or $$\text{freeHeapEstim}_k = \text{totalHeap} - (a * \text{heapUtil}_k + b * \text{admiRate}_k) * \text{totalHeap} \quad (4')$$

The effectiveness of calculation in the above manners will be discussed below with reference to FIG. 6A and FIG. 6B.

Figure 6A:
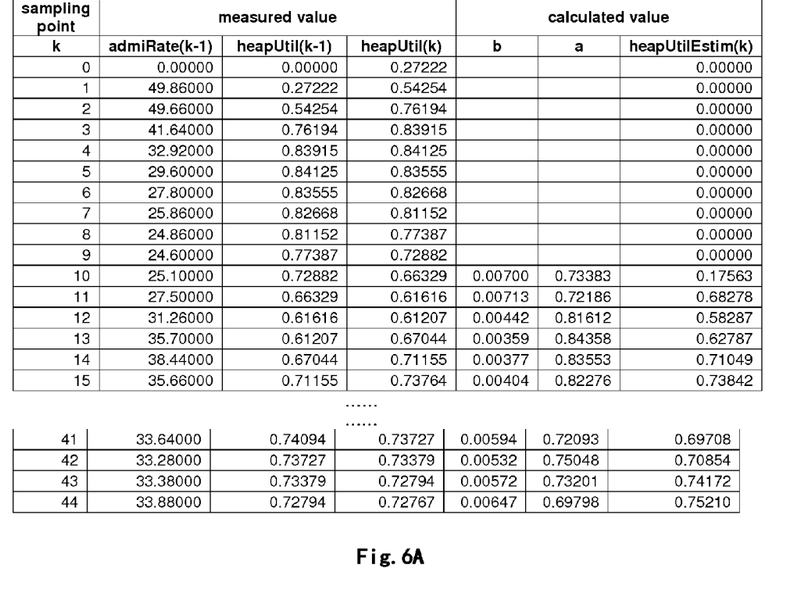
FIGS. 6A and 6B are the table and graph showing the experiment data of estimated heap utilization in accordance with one embodiment of the invention.
Figure 6B:
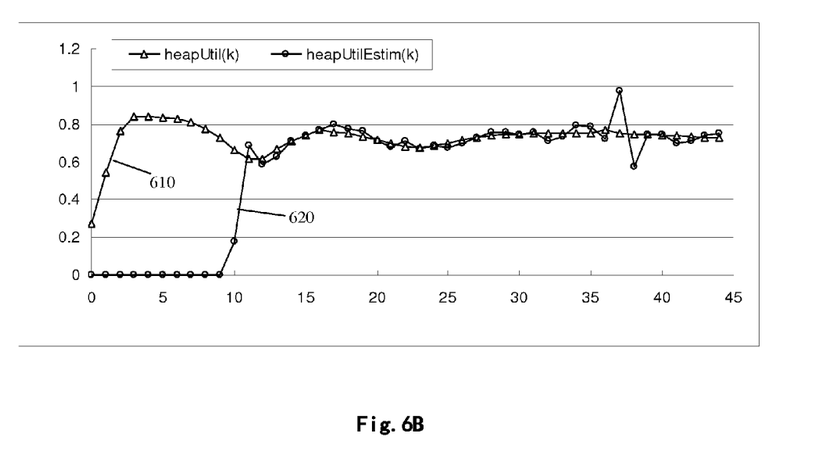

FIGS. 6A and 6B are the table and graph showing the experiment data of heap utilization estimated in according to one embodiment of the invention. The data in the table shown in FIG. 6A comprise measured values of session admission rate AdmiRate, heap utilization HeapUtil and calculated heap utilization HeapUtilEstim per the formula (4) for 45 sampling points (0 ... 44). The parameters a and b are calculated using Linear Fit Method based on the sample data of 10 most recent cycles.

FIG. 6B is the curve graph representation of FIG. 6A. The vertical axis of the curve graph denotes heap utilization and the horizontal axis denotes sampling point according to the time sequence. Starting from the second sampling point (k=1), sampling point k-1 to sampling point k represents a sampling cycle. Curve 610 represents the value of actually measured heap utilization HeapUtil shown in FIG. 6A, and curve 620 represents the value of calculated heap utilization HeapUtilEstim per the formula (4) shown in FIG. 6A. FIG. 6B intuitively shows that there is close correlation between the actually sampled heap utilization heapUtil(k) and the calculated heap utilization heapUtilEstim(k) of cycle k (k=1 ... 44) for most of all cycles. This demonstrates that the estimated value of heap utilization as calculated per the formula (4) is basically in accordance with the actual situation; therefore, it may be effectively applied to the estimation of JVM's heap utilization/usage.

Other steps following the step 430 of the method process will be described below.

If it is determined that the free memory on a target JVM is adequate for storing the corresponding replica shard, the process proceeds to Step 490, where shard replacement is performed, i.e., the corresponding replica shard set is stored onto the target JVM. The details of the process of shard replacement are similar to those described in conjunction with FIG. 2 and FIG. 3, thus are omitted here.

If it is determined that the free memory on a target JVM is not adequate for storing the corresponding replica shard, the process proceeds to Step 440.

In Step 440, the target JVM is caused to stop the creation of session.

According to one embodiment of the invention, a JVM (e.g., JVM 110-2) may be notified to stop the creation of session so as to release memory space for shard replacement. Upon receiving the notification, JVM 110-2 will suspend accepting the request from the proxy 160 for creating new session. Over time, on the one hand, existing sessions in JVM 110-2 will be ended in succession, releasing occupied memory. On the other hand, because JVM 110-2 has suspended the creation of session, there is no need for assigning memory to any new session. Thus, JVM 110-2 may release adequate memory for shard replacement in the shortest time possible.

Then, as shown by the diamond block 450 in the figure, the process will wait for the target JVM to release adequate memory.

During the period of waiting for the target JVM to release memory, if free memory becomes adequate for storing the corresponding replica shard set, the process proceeds to Step 460.

At Step 460, shard replacement is performed on the target JVM, in other words, the corresponding replica shard set is stored onto the target JVM.

Then, at Step 470, the target JVM is caused to resume the creation of session; in other words, the target JVM that has suspended the creation of session is allowed to create session again.

According to one embodiment of the invention, in practice, Steps 450 through 470 may be implemented by interactions between the catalog server 120 and the memory overload controller 116. For example, when the MOC 116 in a JVM 110 detects that free memory of the JVM is already adequate for accommodating the corresponding replica shard set, it will notify the catalog server 120. After the replica shard set is stored onto the target JVM, the catalog server 120 will notify the target JVM 110 to resume accepting the request from the proxy 160 for the creation of new session.

In implementing the invention, the proxy 160 may be notified by the memory overload controller 116 so as to suspend or resume the creation of session on the JVM 110.

Thus, various embodiments of the method provided by the invention of memory overload management for a Web application sever system comprising a plurality of Java virtual machines are described in the above.

Under the same inventive concept, the invention also provides a system of memory overload management for a Web application sever system comprising a plurality of Java virtual machines.

Figure 5:
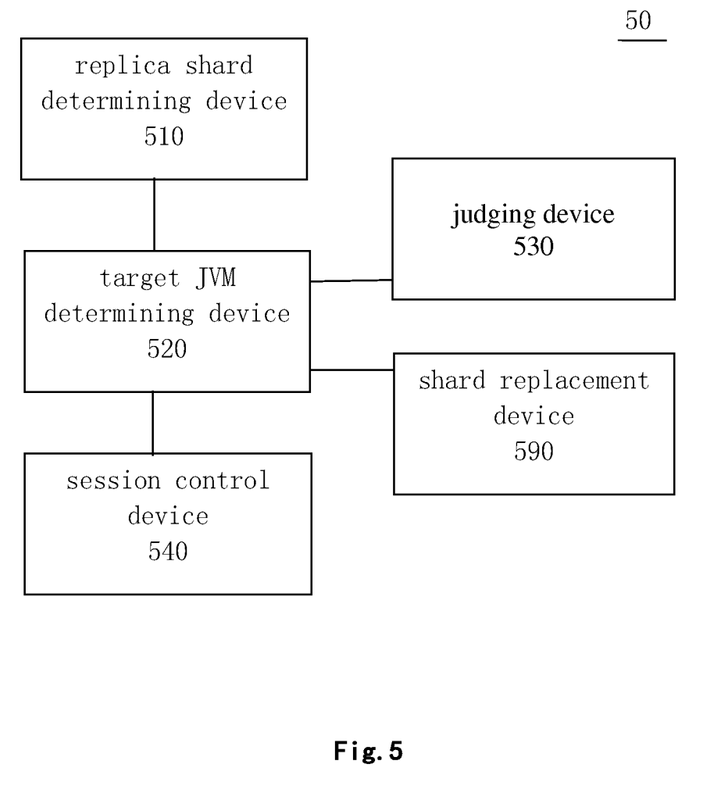
FIG. 5 is an illustrative block diagram of the system in accordance with one embodiment of the invention.

FIG. 5 is an illustrative block diagram of the system 50 in accordance with one embodiment of the invention. Referring to FIG. 5, the system 50 comprises a replica shard determining device 510, a target JVM determining device 520, a judging device 530, a control device 540 and a shard replacement device 590.

The replica shard determining device 510 is configured to determine one or more replica shards for which replacement shall be conducted.

For example, as shown in FIG. 3, when JVM 110-3 is at fault, it is determined that shard replacement needs to be conducted for replica shard 5, replica shard 6, replica shard 2, and replica shard 4. Each of those replica shards has a definite size.

The target JVM determining device 520 is configured to determine one or more target JVMs for storing a corresponding replica shard set including at least one replica shard of the replica shards determined by the replica shard determining device 510.

For example, according to the principle of "storing a shard and its corresponding replica shard on separate JVMs", it is determined that the replica shard 5 and the replica shard 2 shall be stored on JVN 110-2, and the replica shard 6 and the replica shard 4 shall be stored on JVN 110-1.

The judging device 530 is configured to judge whether the free memory of a target JVM is adequate for storing the corresponding replica shard set.

For example, free memory on JVM 110-2 is estimated to judge whether it is adequate for storing the replica shard 5 and the replica shard 2. Because the size of the replica shard 5 and the size of the replica shard 2 are known, it may be determined whether free memory on JVM 110-2 is adequate for storing the replica shard 5 and the replica shard 2 simply by comparing the amount of the free memory with the addition of the two sizes.

Those skilled in the art shall appreciate that the amount of free memory in JVM 110-2 may be obtained or derived from various statistical data gathered by the memory overload controller 116 of JVM 110-2.

The session control device 540 is configured to control the creation of session on a target JVM, based on the judging results of the judging device 230 on whether the free memory of the target JVM is adequate for storing the corresponding replica shard set.

According to one embodiment of the invention, the session control device 540 may cause the target JVM to suspend the creation of session. Particularly, the session control device 540 is configured to cause the target JVM to suspend the creation of session when free memory of the target JVM is not adequate for storing the corresponding replica shard set.

According to one embodiment of the invention, the session control device 540 may cause the target JVM to resume the creation of session. Particularly, the session control device 540 is configured to cause the target JVM to resume the creation of session when free memory of the target JVM is adequate for storing the corresponding replica shard set.

The shard replacement device 590 is configured to store a corresponding replica shard set onto a target JVM when the free memory of the target JVM is adequate for storing the corresponding replica shard set.

According to one embodiment of the invention, the target JVM determining device 520 is configured to take the JVM with short average session life time as target JVM. The length of average session life time is a relative concept. If multiple JVMs are needed, then multiple JVMs with relatively short average session life time may be picked out.

According to one embodiment of the invention, the system 50 may further comprise a calculating device (now shown), which is configured to calculate the JVM's average session life time avgSessLifeTime$_k$ with the formula (2) or (2') as described in the above.

According to one embodiment of the invention, the system 50 may further comprise a calculating device (now shown), which is configured to calculate free memory of the target JVM freeHeapEstim$_k$ with the formula (4) or (4') as described in the above.

The above has described the system of memory overload management for Web application sever systems in accordance with embodiments of the present invention. Because the method of memory overload management for Web application sever systems according to embodiments of the present invention has been described in detail in the above, the description of the system omits the content that repeats or may be derived from the description of the method of memory overload management for Web application sever systems according to embodiments of the present invention.

The various embodiments of the invention have remarkable advantageous effects over the prior art. In the embodiments of the invention, shard replacement is conducted only when there is adequate memory on the target JVM; therefore, the problem of heap utilization on a target JVM exceeding limit caused by shard replacement may be avoided. In the embodiments of the invention, by picking out the JVM with short average session life time as target JVM for shard replacement, potential JVMs with relatively large free memory may be selected. By suspending the creation of session in the target JVM, it is enabled to obtain free memory in the shortest time possible.

It should be noted that the above depiction is only exemplary, not intended for limiting the present invention. In other embodiments of the present invention, the method may have more, or less, or different steps, and numbering the steps is only for making the depiction more concise and much clearer, but not for stringently limiting the sequence between each steps, and the sequence of steps may be different from the depiction. For example, in some embodiments, the above one or more optional steps may be omitted. Specific embodiment of each step may be different from the depiction. All these variations fall within the spirit and scope of the present invention.

The present invention may be implemented by hardware, software, or combination of hardware and software. The present invention may be implemented in a computer system in a collective or distributive manner, where in the distributive manner, different parts are distributed in a plurality of interconnected computer systems. Any computer system or other apparatus suitable for implementing the method as depicted herein is suitable. A typical combination of hardware and software may be a universal computer system with a computer program which, when being loaded and executed, controls the computer system to implement the method of the present invention and constitute the apparatus of the present invention.

The present invention may also be embodied in a computer program product which comprises all features capable of implementing the method as depicted herein and may implement the method when loaded to the computer system.

The present invention has been specifically illustrated and explained with reference to the preferred embodiments. The skilled in the art should understand various changes thereto in form and details may be made without departing from the spirit and scope of the present invention.

The invention claimed is:

1. A method of memory overload management for a Web application server system, wherein the Web application server system comprises multiple Java machines (JVMs) for processing sessions, the method comprising:

determining one or more replica shards for which replacement shall be performed;

determining one or more target JVMs for storing a corresponding replica shard set including at least one replica shard from the one or more replica shards;

calculating JVMs average session lifetime avgSessLifeTime$_k$:

$$\text{avgSessLifeTime}_k = \text{outstandingSess}_k / (0.5 \cdot \text{admiRate}_k + 0.5 \cdot \text{admiRate}_{k-1})$$

wherein outstandingSess$_k$ is the number of currently pending sessions, admiRate$_k$ is the current session admission rate, and admiRate$_{k-1}$ is the session admission rate during the period between two most recent times of global garbage collection (GC); and     for each target JVM, performing the following:

judging whether the free memory of the target JVM is adequate for storing the corresponding replica shard set;

if the judging result is negative, performing the following:

causing the target JVM to suspend the creation of session until the free memory of the target JVM becomes adequate for storing the corresponding replica shard set;

storing the corresponding replica shard set to the target JVM; and             causing the target JVM to resume the creation of session.

2. The method of claim 1, wherein if the judging result is positive, then store the corresponding replica shard set to the target JVM.

3. The method of claim 1, wherein said determining one or more target JVMs for storing a corresponding replica shard set including at least one replica shard from the one or more replica shards comprises taking the JVM with short average session lifetime as target JVM.

4. The method of claim 1, wherein said judging whether the free memory of the target JVM is adequate for storing the corresponding replica shard set further comprises calculating the free memory of the target JVM freeHeapEstim$_k$ with the following formula:

$$\text{freeHeapEstim}_k = \text{totalHeap} - \text{heapUtilEstim}_k \cdot \text{totalHeap}$$

wherein totalHeap denotes the total amount of memory, and heapUtilEstim$_k$ is the estimated value of heap utilization between the most recent global GC and the next global GC.

5. The method of claim 4, wherein $$\text{heapUtilEstim}_k = a \cdot \text{heapUtil}_k + b \cdot \text{admiRate}_k, \text{ and}$$

wherein heapUtil$_k$ is the heap utilization after the most recent GC, admiRate$_k$ is the current session admission rate, and a and b are experience parameters learned from the session admission rate and the heap utilization obtained from past sampling cycles.

6. The method of claim 1, wherein the Web application server system comprises a catalog server by which the replica shard are stored onto the target JVM.

7. The method of claim 6, further comprising:

the target JVM is notified by the catalog server to resume accepting request for the creation of session after the corresponding replica shard set are stored onto the target JVM.

8. A system of memory overload management for a Web application server system, the Web application server system comprising multiple Java machines (JVMs) for processing sessions, the system comprising:

a replica shard determining device, configured to determine one or more replica shards for which replacement shall be conducted;

a target JVM determining device, configured to determine one or more target JVMs for storing a corresponding replica shard set including at least one replica shard from the one or more replica shards determined by the replica shard determining device;

a device for calculating the JVMs average session lifetime avgSessLifeTime$_k$ according to the following formula:

$$\text{avgSessLifeTime}_k = \text{outstandingSess}_k / (0.5 \cdot \text{admiRate}_k + 0.5 \cdot \text{admiRate}_{k-1})$$

wherein outstandingSess$_k$ is the number of currently pending sessions, admiRate$_k$ is the current session admission rate, and admiRate$_{k-1}$ is the session admission rate during the period between two most recent times of global garbage collection (GC);

a judging device, configured to judge whether the free memory of a target JVM is adequate for storing the corresponding replica shard set;

a session control device, configured to control the creation of session on a target JVM depending on whether the free memory of the target JVM is adequate for storing the corresponding replica shard set; and     a shard replacement device, configured to store a replica shard onto a target JVM when the free memory of the target JVM is adequate for storing a corresponding replica shard set.

9. The system of claim 8, wherein the session control device is configured to cause the target JVM to suspend the creation of session when the free memory of the target JVM is not adequate for storing the corresponding replica shard set.

10. The system of claim 9, wherein the session control device is configured to cause the target JVM to resume the creation of session when the free memory of the target JVM is adequate for storing the corresponding replica shard set.

11. The system of claim 8, wherein the target JVM determining device is configured to take the JVM with short average session lifetime as target JVM.

12. The system of claim 8, further comprising a device for calculating the free memory of the target JVM freeHeapEstim$_k$ with the following formula:

$$\text{freeHeapEstim}_k = \text{totalHeap} - \text{heapUtilEstim}_k \cdot \text{totalHeap}$$

wherein totalHeap denotes the total amount of memory, and heapUtilEstim$_k$ is the estimated value of heap utilization between the most recent global GC and the next global GC.

13. The system of claim 8, wherein $$\text{heapUtilEstim}_k = a \cdot \text{heapUtil}_k + b \cdot \text{admiRate}_k, \text{ and}$$

wherein heapUtil$_k$ is the heap utilization after the most recent GC, admiRate$_k$ is the current session admission rate, and a and b are experience parameters learned from the session admission rate and the heap utilization obtained from past sampling cycles.

* * * * *